Jan. 7, 1958   J. M. SCHUTZ   2,818,902
SEALING COMPOUND FOR TUBELESS TIRE
Filed Oct. 21, 1952   2 Sheets-Sheet 1

INVENTOR.
JOSEPH M. SCHUTZ
BY W. A. Fraser
ATTY.

Jan. 7, 1958   J. M. SCHUTZ   2,818,902
SEALING COMPOUND FOR TUBELESS TIRE

Filed Oct. 21, 1952   2 Sheets-Sheet 2

INVENTOR.
JOSEPH M. SCHUTZ
BY W. A. Fraser
ATTY.

United States Patent Office 2,818,902
Patented Jan. 7, 1958

2,818,902

SEALING COMPOUND FOR TUBELESS TIRE

Joseph Michael Schutz, Akron, Ohio, assignor to The Firestone Tire & Rubber Company, Akron, Ohio, a corporation of Ohio Application October 21, 1952, Serial No. 315,964

6 Claims. (Cl. 152—347)

This invention relates to sealing compositions used in puncture-healing articles and more particularly relates to articles such as tire inner tubes and tubeless tires provided internally with an element of puncture healing composition.

The practice has been to provide certain types of tire inner tubes with a layer of a sealing composition in the crown region thereof to heal punctures caused by penetration of pointed objects through the air retaining wall. Such practice has been continued with the advent of tubeless tires wherein an element of sealing composition is applied on the inside of the air retaining cavity in the crown region of such a tire to provide for puncture healing.

Although natural rubber has been used as the rubber hydrocarbon constituent of the composition of such a sealant, for various reasons it has been unsatisfactory and generally a composition has been adapted comprising a partially vulcanized rubbery copolymer of a major portion of an isoolefin having from 4 to 7 carbon atoms with a minor proportion of an open-chain conjugated diolefin having from 4 to 8 carbon atoms. This copolymer is generally known as "butyl rubber." "Butyl" rubber compositions although acceptable for a sealant in some respects, in the vulcanized state have very poor adhesion to adjacent tire portions comprised of rubbery compositions other than butyl rubber unless expensive and complicated steps are taken during manufacture to insure good adhesion. However, even with great care and laborious effort during tire building, difficulty is experienced in obtaining sufficient adhesion between a butyl sealant and the adjacent tire portions to resist the stress of high centrifugal force during road operation of the tire.

Another problem in the use of butyl type sealants is that after extended periods of tire operation the sealant surface cracks to produce an undesirable appearance as well as a lack of sealing protection at the cracks.

An object of the present invention, therefore, is to provide a sealing composition which has improved properties of adhesion to the vulcanized rubbery components of a tire in addition to good puncture sealing characteristics.

Yet another object of this invention is to provide a sealing composition which will maintain position in the crown of a tire or in the crown of a tire tube despite the rigorous centrifugal action of rotation at high speed.

A further object of this invention is to provide a puncture healing article comprised of a sealing composition of a copolymer of butadiene and styrene polymerized at relatively low temperatures.

Yet another object of this invention is to provide a sealing composition for tires or tire tubes with improved crack resistance during tire service.

These and other objects will be more readily understood by reference to the preferred form of the invention shown in the formal drawings wherein.

An article constructed in accordance with the foregoing objects of the invention contains a sealing element comprised of a copolymer of a major proportion butadiene and a minor proportion styrene polymerized in a redox system at temperatures below 122° F. Such a copolymer is commonly termed a "cold rubber" or "low temperature" GR–S. Methods for preparing such polymers are described in an article in Industrial and Engineering Chemistry, May 1948 by McKenzie, Samuels and Sheron. This article describes butadiene and styrene copolymerized below the formerly conventional polymerization temperature of 122° F. While copolymers of butadiene and styrene copolymerized at temperatures of 122° F. are not generally satisfactory as sealant materials, it has been found that such a copolymer copolymerized at temperatures under 58° F. generally form good sealants when properly compounded. Polymerization temperatures of 58° F., 41° F., 14° F., 0° F. and —14° F. are particular examples of polymers which have been tried out in connection with the present invention although the invention is not necessarily limited to these temperatures.

Figure 1:
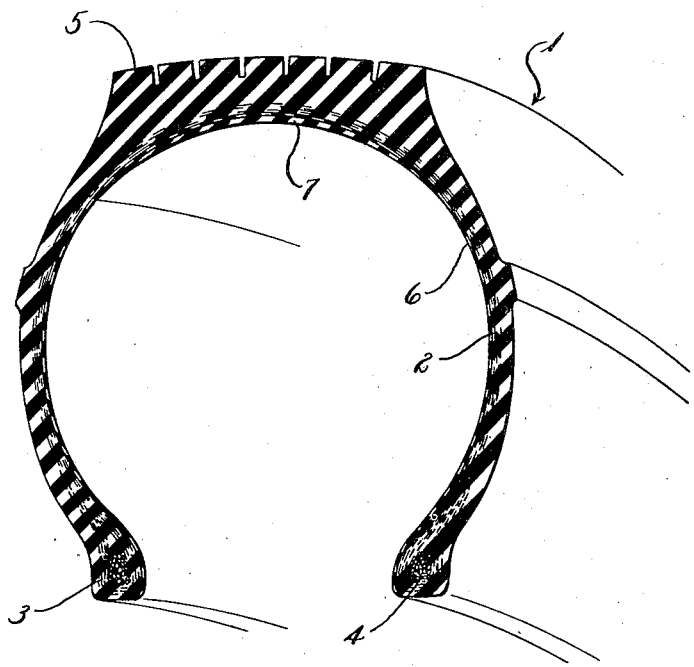
Figure 1 is a sectional view partly in perspective of a tubeless tire employing the invention.

Referring to Figure 1 a tubeless tire generally indicated at 1 is shown comprised of body portion 2, inextensible bead portions 3 and 4 and tread element 5. To provide for retention of air under pressure during operation of the tire on a vehicle the entire inner surface of the tire which defines the air retaining cavity is lined with a vulcanized rubbery air impervious liner 6. Such liner may be comprised of either natural or synthetic rubber. Sealant 7 covers the liner 6 over that surface thereof which lies in the portion of the tire generally designated as the crown which is essentially adjacent to the road contacting surface of the tread.

Figure 2:
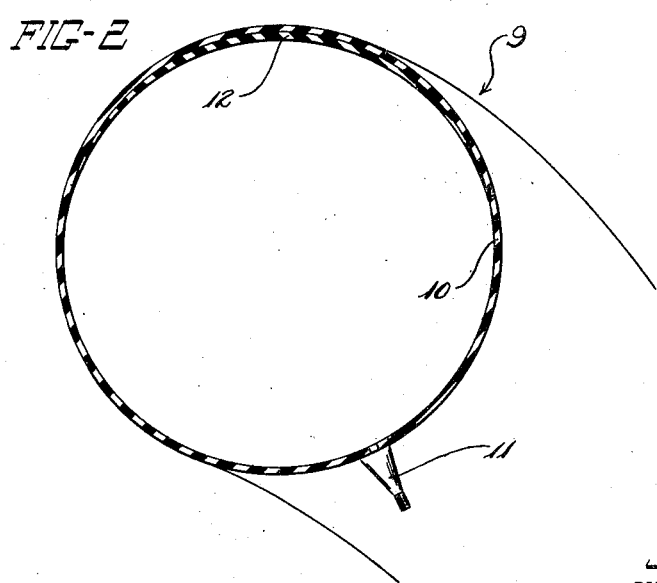
Figure 2 is a sectional view partly in perspective of a puncture proof tube employing the invention.

A puncture proof tube generally indicated at 9 is shown in Figure 2. Such a tube is comprised of an air impervious rubbery wall 10 provided with a valve 11 adapted for inflating the tube with air under pressure. The tube is protected against air loss from punctures by sealant member 12 in the crown comprised of the novel composition to be described hereinafter.

Figure 3:
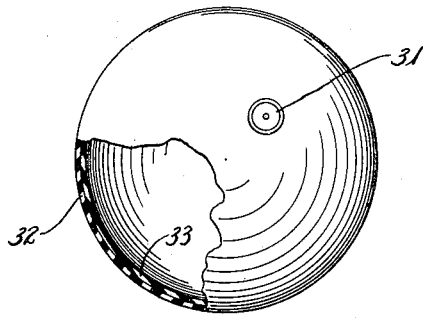
Figure 3 is a perspective view partly broken away in perspective of an inflatable self-healing article of the invention.
Figure 4:
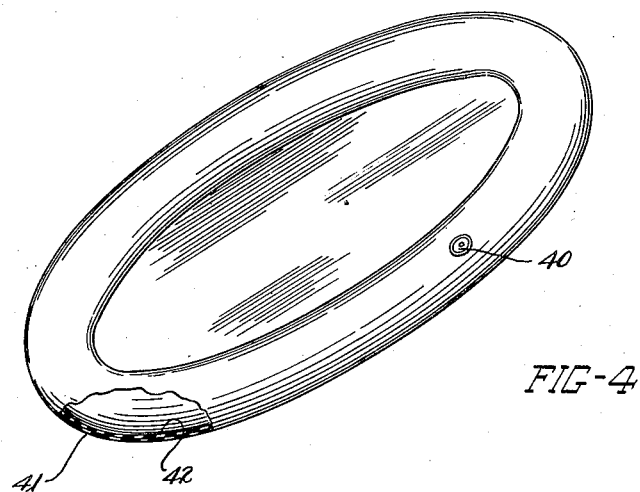
Figure 4 is a perspective view partially broken away in perspective of an inflatable self-healing article of the invention.

Figure 3 shows an inflatable rubber ball provided with valve 31, flexible wall 32 and sealant layer 33 to heal punctures. Figure 4 illustrates another inflatable article such as a child's rubber swimming pool comprised of inflation valve 40, flexible wall 41 and sealant layer 42 designed to heal punctures.

NAIL BOARD TEST

To test the sealing characteristics of the sealants such as novel sealant 7, the composition of which is to be hereinafter described, a tire provided with such a sealant is mounted on an automobile test wheel and punctured by running over a board from which six 8-penny nails protrude. The automobile test wheel next is dismounted and immersed in a tub of water and the surface of the tire is checked for possible bubbles of escaping air at the points of nail puncture. Sealants tested in this manner are reported either as satisfactory or unsatisfactory, depending upon whether or not air escapes from the puncture holes left by the nails.

HOT AND COLD NAIL TEST

To determine the puncture sealing characteristics of the sealant of the invention at different conditions of temperature, a tire is mounted upon a test wheel and run for ten miles on an automobile for warmup. Four 8-penny nails then are hammered into the tire and the car is run 100 miles. The test wheel is dismounted from the automobile and after 30 minutes two of the nails are pulled from the tire. The tire and wheel assembly is immersed in water to note any air escaping at the punctures. Results of this test are reported as hot air loss results and are indicated as satisfactory or unsatisfactory.

After the hot air loss test the tire is allowed to cool for 18 hours and the two remaining nails are withdrawn. The tire and wheel assembly is again immersed in water to note any air escaping from the punctures and the results are reported as cold air loss results.

In all formulations given below parts are by weight based on 100 parts by weight of copolymer material in the composition.

Example 1

| | |
|---|---|
| Low temperature polymer [1] | 100 |
| Iron oxide | 30 |
| Zinc oxide | 3 |
| Rubber softener | 50 |
| Sulfur | .5 |
| Boric acid | .5 |
| Rubber accelerator | .75 |
| Peptone 22 [2] | 3 |
| | 187.75 |

[1] Polymerized at 41° F.
[2] Di-ortho-benzamidophenyl disulfide manufactured by American Cyanamide Co.

A sealant composition was mixed on a two-roll mill according to the above formula and tubed to the desired dimensions to provide a sealing element to fit the crown of a tire. The tire was vulcanized and mounted on a car wheel and the aforementioned nail tests were run with satisfactory results.

ENDURANCE TEST

Four tubeless tires were built using a sealant composed of the composition of Example 1 over 180° of the inside crown surface of the band ply of each tire. The other 180° of the inside crown surface of the band ply was covered with a sealant composed of a conventional sealing composition comprised of butyl type rubber. The tires were run on a test car underinflated and overloaded for 23,000 miles to compare the cracking and blistering characteristics of each sealant. The results as follow show the improved performance of the novel low temperature polymerized butadiene-styrene polymer, identified as "LTP":

| Sealant Appearance | Prior Art Butyl Sealant | LTP Sealant |
|---|---|---|
| Blisters Present | Considerable | None. |
| Cracks Present | do | Very slight. |

Example 2

| | |
|---|---|
| LTP [1] | 100 |
| Zinc oxide | 3 |
| Calcium carbonate | 15 |
| Rubber softener | 50 |
| Sulfur | .5 |
| Boric acid | .5 |
| Rubber accelerator | .75 |
| Peptone 22 | 3.0 |
| | 172.75 |

[1] Polymerized at 41° F.

A sealant composition was mixed according to the above formula on a two-roll mill and tubed to dimensions to provide a sealing element to fit the crown of the tire. The tire with the sealant of the above composition was vulcanized and mounted on a car wheel and the aforementioned nail tests were run with the satisfactory results.

Example 3

| | |
|---|---|
| LTP [1] | 100 |
| Iron oxide | 45 |
| Zinc oxide | 3 |
| Stabilite resin [2] | 20 |
| Petroleum softener | 30 |
| Sulfur | .5 |
| Boric acid | .5 |
| Rubber accelerator | .75 |
| | 199.75 |

[1] Polymerized at 41° F.
[2] Hydrogenated rosin manufactured by Hercules Powder Company.

A sealant composition was mixed according to the above formula on a two-roll mill and tubed to size to provide a sealing element to fit the crown of the tire. The tire was vulcanized and mounted on a car wheel and the aforementioned nail tests were run with the following results:

Nail board test: Satisfactory
Hot nail test: Satisfactory
Cold nail test: Satisfactory It is thought that the novel composition attains its puncture sealing characteristics by clinging to the nail protruding through the tire body into the air-containing cavity. As the nail is withdrawn the novel composition is pulled into the hole left by the nail thereby healing the puncture and sealing the air-containing cavity against loss of air. It is a surprising fact that although compounds comprised of butadiene and styrene copolymerized at a temperature of 122° F. will not retain satisfactory puncture sealing characteristics over a wide range of temperatures, butadiene and styrene copolymerized at lower temperatures such as 58°, 48°, 41°, 14° and 0° F. compounded as in the examples will seal punctures over a wide range. This fact combined with the excellent adhesion of the cured polymer to other natural and synthetice rubber elements makes its use ideal for self-healing articles.

The above formulae are given only as illustrations and it is to be understood that variations in constituents may be made by those familiar with the art of rubber compounding. For example, accelerator and sulfur variations may be made to obtain an optimum state of vulcanization depending upon the inflatable article being vulcanized as well as upon the heat and time of vulcanization. However, for best puncture-sealing characteristics the sulfur content available for vulcanization should be between .2 and 1.0 part by weight based upon 100 parts of copolymer.

In place of butadiene in the rubbery copolymer, other open-chain conjugated diolefins may be used such as piperylene, 2,3-dimethyl butadiene-1,3; 3-methyl pentadiene-1,3; 2-methyl pentadiene-1,3; hexadiene-2,3; hexadiene-2,4; isoprene and others. In this invention the use of butadiene-1,3 and isoprene are preferred, but not to be deemed as limiting.

Aryl substituted ethylene monomers polymerizable with the diene monomer include styrene, alpha methylstyrene, p-chloro styrene, p-methoxy styrene, vinyl naphthalene and others. In this invention styrene is preferred but is not to be deemed limiting.

The iron oxide content may be varied from 15 to 45 parts by weight on the copolymer depending upon the type of tire in which the sealant is to be used. The iron oxide should be essentially copper free with not over .06% copper present. The FeO content should not be below 23% while the fineness of this oxide should should be such that not less than 99% will pass through a sieve rated at 300 mesh to the inch.

Calcium carbonate may be substituted for iron oxide in the same proportions by weight. The calcium carbonate is preferably of a fineness such that 100% will pass through a sieve rated at 100 mesh per inch while at least 99% will pass through a sieve rated at 300 mesh per inch. The moisture content of this material should not exceed .25% by weight. The fine particle size of the iron oxide and calcium carbonate is necessary to provide a sealant with good resistance to cracking.

Several preferred embodiments of the invention have been described in considerable detail but it will be understood that variations and modifications may be effected within the spirit and scope of the invention as defined in the following claims:

I claim:

1. A pneumatic tire comprised of a rubbery tread portion, an open bellied fabric body portion terminating in inextensible edge portions to define in combination with a wheel rim a cavity for retaining air under pressure, a rubbery air impervious liner portion adhered to and covering the cavity defining surface of said fabric body and extending from one edge portion to the other edge portion, and a rubbery sealing layer adhered to said liner portion and extending substantially the width of said tread portion, said sealing portion comprising a rubbery copolymer of butadiene and styrene copolymerized at a temperature of about 41° F., a sulfur content of .5 percent by weight based on the copolymer content and an iron oxide content of about 30 percent by weight of copolymer.

2. In a pneumatic tire comprised of a rubbery tread portion, an open bellied fabric body portion terminating in inextensible edge portions to define in combination with a wheel rim an air retaining cavity, a rubbery air impervious liner portion adhered to and covering the cavity defining surface of said fabric body and extending from one edge portion to the other edge portion, a rubbery sealing layer adhered to said liner portion and extending substantially the width of said tread portion, said sealing portion comprising a rubbery copolymer of butadiene and styrene copolymerized at a temperature not exceeding 58° F., a sulfur content of .5 percent by weight of copolymer, and an iron oxide content of about 30 percent by weight of copolymer.

3. In a pneumatic tire comprised of a rubbery tread portion, an open bellied fabric body portion terminating in inextensible edge portions to define in combination with a wheel rim a cavity for retaining air under pressure, a rubbery air impervious liner portion adhered to and covering the cavity defining surface of said fabric body and extending from one edge portion to the other edge portion, a rubbery sealing layer adhered to said liner portion and extending substantially the width of said tread portion, said sealing portion comprising a rubbery copolymer of butadiene and styrene copolymerized at a temperature not exceeding 58° F., with a sulfur content of not exceeding .5 percent by weight of copolymer and an iron oxide loading of not exceeding 60 parts by weight of copolymer.

4. A rubbery article adapted to contain gas under pressure having an outer layer of vulcanized rubbery material susceptible to puncture adhered in face to face relation to an inner layer of a soft rubbery puncture sealing material, said puncture sealing material comprised of a rubbery copolymer of a polymerizable conjugated diolefin and an aryl substituted ethylene-monomer copolymerized at a temperature not exceeding 58° F., an iron oxide content of from 15–60 parts based on the weight of copolymer and a sulfur ratio of not over .50 part by weight based on the weight of copolymer, the iron oxide being not less than 23% FeO and having a fineness such that at least 99% will pass through the openings of a sieve provided with 300 openings per square inch.

5. A rubbery article adapted to contain gas under pressure having an outer layer of vulcanized rubbery material susceptible to puncture adhered in face to face relation to an inner layer of a soft rubbery puncture sealing material, said puncture sealing material comprised of a rubbery copolymer of butadiene and styrene copolymerized at a temperature not exceeding 58° F., an iron oxide content of from 15–60 parts based on the weight of copolymer and a sulfur ratio of not over .50 part by weight based on the weight of copolymer, the iron oxide not being less than 23% FeO and a fineness such that at least 99% will pass through the openings of a sieve provided with 300 openings per square inch.

6. A rubbery article adapted to contain gas under pressure having an outer layer of vulcanized rubbery material susceptible to puncture adhered in face to face relation to an inner layer of a soft rubbery puncture sealing material, said puncture sealing material comprised of a rubbery copolymer of butadiene and an aryl substituted ethylene copolymerized at a temperature not exceeding 58° F., an iron oxide content of about 30 parts based on the weight of copolymer and a sulfur ratio of not over five parts by weight based on the weight of copolymer, the iron oxide not being less than 23% FeO and a fineness such that at least 99% will pass through the openings of a sieve provided with 300 openings per square inch.

References Cited in the file of this patent

UNITED STATES PATENTS

| 2,427,942 | Bulifant | Sept. 23, 1947 |
| 2,430,385 | Bulifant | Nov. 4, 1947 |
| 2,566,384 | Tilton | Sept. 4, 1951 |
| 2,587,470 | Herzegh | Feb. 26, 1952 |
| 2,609,362 | Fryling | Sept. 2, 1952 |

OTHER REFERENCES

Shearon Industrial Engineering and Chemistry, vol. 40, No. 5, May 1948, pages 769–777.